(12) United States Patent
Wang et al.

(10) Patent No.: US 12,304,379 B2
(45) Date of Patent: May 20, 2025

(54) VEHICULAR HEADLAMP ADJUSTMENT DEVICE

(71) Applicant: NINGBO JINGHUA ELECTRONICS TECHNOLOGY CO., LTD., Ningbo (CN)

(72) Inventors: Yiming Wang, Ningbo (CN); Qinglong Zhang, Ningbo (CN); Jinyao Xu, Ningbo (CN); Haisong Wu, Ningbo (CN); Hui Xiao, Ningbo (CN)

(73) Assignee: NINGBO JINGHUA ELECTRONICS TECHNOLOGY CO., LTD., Ningbo (CN)

( * ) Notice: Subject to any disclaimer, the term of this patent is extended or adjusted under 35 U.S.C. 154(b) by 21 days.

(21) Appl. No.: 18/521,803

(22) Filed: Nov. 28, 2023

(65) Prior Publication Data

US 2025/0074290 A1      Mar. 6, 2025

(30) Foreign Application Priority Data

Aug. 31, 2023   (CN) .......................... 202311109310.2

(51) Int. Cl.
*B60Q 1/076*       (2006.01)
*F21V 21/15*       (2006.01)

(52) U.S. Cl.
CPC .......... *B60Q 1/076* (2013.01); *B60Q 2200/30* (2013.01); *B60Q 2200/32* (2013.01)

(58) Field of Classification Search
CPC ........................... B60Q 2200/32; B60Q 1/076
See application file for complete search history.

(56) References Cited

U.S. PATENT DOCUMENTS

2006/0291231 A1 * 12/2006 Deguchi ............... B60Q 1/076
                                                                                    362/512

FOREIGN PATENT DOCUMENTS

| CN | 109649259 A   | * | 4/2019 | ............ B60Q 1/076 |
| EP | 0793076 A1    | * | 9/1997 | ............ B60Q 1/076 |
| JP | 2014051257 A  | * | 3/2014 | |
| WO | WO-2005042304 A2 | * | 5/2005 | ............ B60Q 1/068 |

OTHER PUBLICATIONS

Machine Translation of CN109649259A, retrieved from worldwide.espacenet.com on Feb. 25, 2025 (Year: 2025).*
Machine Translation of JP2014051257, retrieved from worldwide.espacenet.com on Feb. 25, 2025 (Year: 2025).*

* cited by examiner

*Primary Examiner* — Abdulmajeed Aziz
*Assistant Examiner* — Steven Y Horikoshi

(57) ABSTRACT

A vehicular headlamp adjustment device is provided which comprises a housing, and a motor assembly, a dual gear, a gear disk and an inner sleeve tube; a ball head ejector rod is helically assembled in the inner sleeve tube, and the motor assembly runs through a dual gear to drive the gear disk to rotate; the housing further comprises an outer sleeve tube. One end of the outer sleeve tube is rotatably connected to the housing, and the other end clamped and matched with the ball head ejector rod. When manually rotating the outer sleeve tube, the ball head ejector rod rotates with it; due to spiral fit between the ball head ejector rod and the inner sleeve tube, and the relative sliding between the outer sleeve tube and the ball head ejector rod, the ball head ejector rod expands and contracts axially under the action of the spiral structure.

9 Claims, 15 Drawing Sheets b direction a direction

I-I c direction

VEHICULAR HEADLAMP ADJUSTMENT DEVICE

This application is based upon and claims priority to Chinese Patent Application No. 202311109310.2, filed on Aug. 31, 2023, the entire contents of which are incorporated herein by reference.

TECHNICAL FIELD

The present disclosure relates to the technical field of vehicular headlamp adjustment devices and in particular to a vehicular headlamp adjustment device.

BACKGROUND

Vehicle headlamps, as importance accessories of vehicles, should, when lighting up a road ahead, beam down to road surface ahead without generating glaring light toward vehicles coming up along an opposite direction, so as to ensure drivability and safety. Nevertheless, due to the effect of vehicle suspensions, when a load of the vehicles changes or a speed of the vehicles changes, an angle of inclination of the vehicle body of the vehicles relative to the road surface will change greatly, leading to change of an illumination distance of the low-beam lamps. When a vehicle has a load increased or a speed increased, the vehicle may witness a phenomenon of a rear part lowered and a front part lifted, leading to a lifted beam of the lamps. In this case, a driver of a vehicle coming up from the opposite direction will get glared and have a narrower field of vision. By contrast, when a vehicle is braked unexpectedly, the vehicle will witness a phenomenon of a front part lowered and a rear part lifted, leading to lowered beam of the lamps. In this case, most of the light is irradiated to the road surface, affecting its function and travel safety.

Along with the development of the vehicular safe illumination technologies, the intelligent light adjusting system of the vehicles, especially the headlamp light-adjusting motor of the vehicles, is applied more and more widely. The light-adjusting motor works based on the following principle: the motor in a housing drives the rotation of an internal transmission mechanism and the internal transmission mechanism brings a light-adjusting mechanism to work; an external sleeve tube in the light-adjusting mechanism rotates to drive a ball head ejector rod to extend or retract, and a light reflection bowl of the headlamps is driven to swing back and forth around a rotary shaft, so as to change a light source distance of the vehicle and illuminate different ranges.

In the prior arts, there is only a single adjustment mode for the ball head ejector rod in the vehicular headlamp light-adjusting mechanism, for example, single motor adjustment or single hand adjustment. Furthermore, in a conventional manual adjustment structure, the operation has low stability, leading to lower adjustment accuracy.

SUMMARY

The problem to be solved by the present disclosure is to overcome at least one defect in the prior arts by providing a vehicular headlamp adjusting device, which can not only achieve telescoping adjustment for a ball head ejector rod by using a motor adjustment drive structure but also achieve adjustment to the ball head ejector rod by using a more stable manual adjustment structure.

In order to solve the above problems, the present disclosure provides a vehicular headlamp adjustment device, which comprises a housing. A mounting groove is disposed at a side of the housing and a motor assembly is disposed inside the mounting groove. A cover plate is disposed at an opening end of the mounting groove. At the other side of the housing is disposed a mounting hole in communication with the mounting groove, and a gear disk is rotatably disposed inside the mounting hole, where a gear portion of the gear disk is located inside the mounting groove. A dual gear is further disposed inside the mounting groove. A first gear of the dual gear is in transmission cooperation with the motor assembly and a second gear of the dual gear is engaged with the gear portion of the gear disk. An inner sleeve tube is cooperated helically in an inner hole of the gear disk, and a ball head ejector rod is helically assembled in the inner sleeve tube. An outer sleeve tube is further disposed in the mounting hole and sleeved outside the inner sleeve tube. A positioning sleeve tube is disposed coaxially with the mounting hole at one end of the housing away from the mounting groove. A plurality of limiting snap catches are disposed along the periphery of the positioning sleeve tube on the housing. One end of the outer sleeve tube is sleeved outside the positioning sleeve tube, and limiting grooves cooperating with the limiting snap catches are disposed an outer wall of one end of the outer sleeve tube close to the positioning sleeve tube. Two groups of axially-staggered positioning bosses are disposed on an inner wall of the other end of the outer sleeve tube, and a plurality of circumferentially-extending process grooves are disposed on a sidewall of one end of the outer sleeve tube close to the positioning boss. A plurality of circumferentially and uniformly-distributed and axially-extending positioning grooves are disposed on a peripheral wall of one end of the ball head ejector rod away from the inner sleeve tube, and each positioning boss is cooperated in the corresponding positioning groove. A manual adjustment piece is further disposed on the outer sleeve tube to drive circumferential rotation of the ball head ejector rod. With the helical cooperation structure of the ball head ejector rod and the inner sleeve tube, the ball head ejector rod can perform axial movement in the inner sleeve tube.

Compared with the prior arts, the present disclosure has the following beneficial effects.

In the vehicular headlamp adjustment device structure of the present disclosure, not only can automatic adjustment to the ball head ejector rod be achieved by using the motor assembly and also manual adjustment can be achieved by using the outer sleeve tube. Specifically, the motor assembly drives the rotation of the inner sleeve tube and further brings the ball head ejector rod helically cooperated in the inner sleeve tube to make telescoping movement, thus achieving electrical adjustment process. When manual adjustment is to be performed, the outer sleeve tube is rotated by simply using a dedicated tool. During the rotation of the outer sleeve tube, the rotation of the ball head ejector rod can be driven by the cooperation of the positioning bosses and the positioning grooves, and under the drive of the helical cooperation structure of the ball head ejector rod and the inner sleeve tube, the ball head ejector rod can achieve axial telescoping movement. More importantly, in this structure, in the assembling structure of the inner sleeve tube and the outer wall of the ball head ejector rod, two groups of axially-staggered positioning bosses are disposed. The axial staggering design can prevent the outer sleeve tube from generating excessive deformation radially in a same plane when one end of the outer sleeve tube away from the housing slides on the positioning grooves on the outer wall of the ball head ejector rod, thus avoiding damage to the parts. Furthermore, hollow process grooves are designed at a side of the outer sleeve tube close to the positioning boss. This structure increases the deformability performance of the positioning bosses sliding outside the positioning grooves on the outer sleeve tube, namely, the entire assembling structure will be more stable, ensuring the accuracy and stability of the manual adjustment.

As an improvement, each group of positioning bosses comprises two symmetrically-disposed trapezoid bosses, and the positioning grooves are triangular grooves. The small-diameter end of each trapezoid boss is cooperated in the corresponding triangular groove.

As a further improvement, external thread is disposed on an outer wall of one end of the ball head ejector rod close to the inner sleeve tube, and a baffle block is disposed on the outer wall of the ball head ejector rod to divide the external thread into two parts of structure. At least two local thread blocks cooperating with the external thread are disposed on the inner wall of the inner sleeve tube, and a limiting block is further disposed on the inner wall of the inner sleeve tube. A guide block is further disposed on the outer wall of one end of the ball head ejector rod close to the inner sleeve tube. When the ball head ejector rod and the inner sleeve tube rotate to a lower limit position, a side face of the guide block is abutted against one side face of the limiting block; when the ball head ejector rod and the inner sleeve tube rotate to an upper limit position, the baffle block is abutted against another side face of the limiting block.

As a further improvement, one end of the inner sleeve tube close to the gear disk cooperates with the gear disk through thread, and two axially-symmetrical rectangular bosses disposed on the outer wall of the other end of the inner sleeve tube. Two elongated grooves cooperating with the corresponding rectangular bosses respectively are disposed symmetrically on the inner wall of the outer sleeve tube. One end of the inner sleeve tube close to the gear disk is provided with a limiting plate extending to the mounting groove, and a limiting fitting groove cooperating with a potentiometer rod on the motor assembly is opened on an end portion of the limiting plate. One end of the inner sleeve tube close to the gear disk is further provided with a positioning block protruding outwardly along a radial direction, and two limiting columns are disposed on the cover plate. The positioning block is cooperatively limited between the two limiting columns. In the above improved structure, three anti-rotation structures are disposed between the inner sleeve tube and the housing, which effectively increases the stability of the inner sleeve tube during the rotation of the gear disk. Therefore, under the drive of the inner thread of the gear disk, the inner sleeve tube achieves the axial telescoping movement only and further brings the ball head ejector rod to extend or retract stably and reliably.

As a further improvement, a positioning convex block is disposed on an inner wall of one end of the mounting hole away from the positioning sleeve tube, and an annular positioning groove cooperating with the positioning convex block is disposed on an outer wall of one end of the gear disk inside the mounting hole. A reinforcing convex ring is disposed at a position close to the annular positioning groove on the outer wall of the gear disk. Further, a plurality of reinforcing convex ribs extending axially are disposed on an outer wall of a part of the gear disk between the reinforcing convex ring and the gear portion of the gear disk. In the above improved structure, the disposal of the reinforcing convex ring and the reinforcing convex ribs effectively intensifies the pull-out force of the gear disk from the housing.

As a further improvement, a positioning column is disposed on a sidewall of the cover plate close to the mounting groove, and a positioning hole in insertion cooperation with the positioning column is disposed at one end of the dual gear close to the first gear. An insertion column is disposed at the other end of the dual gear, and an insertion hole in insertion cooperation with the insertion column is disposed on a bottom wall of the mounting groove. Further, the insertion column is in interference fit with the insertion hole, and an end face of the insertion column is abutted against a bottom face of the insertion hole. In the above improved structure, both ends of the dual gear are fixed to the cover plate and the housing respectively by an insertion structure, without needing fasteners, thus facilitating the dismounting process.

As a further improvement, annular insertion groove is concavely disposed on an end face of the first gear of the dual gear close to the second gear, and a cross section of the annular insertion groove is a trapezoid structure with upper part being large and lower part being small. A positioning convex column is disposed on the bottom wall of the mounting groove and the insertion hole is formed on an end face of the positioning convex column. An annular insertion portion is further disposed around the positioning convex column on the bottom wall of the mounting groove. The annular insertion portion is cooperatively inserted into the annular insertion groove, and there is a gap reserved between an outer end face of the annular insertion portion and the bottom of the annular insertion groove. In the above improve structure, the radial limiting of the end of the dual gear away from the cover plate and the housing is carried out by the assembling structure of the trapezoid groove and the annular insertion portion, and the two components are not axially abutted against each other when assembled, so as to avoid excessive axial positioning.

As a further improvement, the motor assembly comprises a motor and a circuit board for controlling the operation of the motor. The circuit board is mounted in the mounting groove and the motor is fixed on an inner wall of the mounting groove. An output shaft of the motor is connected with a worm rod engaged with the first gear of the dual gear.

As a further improvement, one end of the worm rod is provided with an assembling hole in which the output shaft of the motor is in interference fit. Further, a cross guide groove is designed at one end of the assembling hole close to the motor. In the above improved structure, the cross guide groove enables the output shaft and the worm rod to be assembled more easily and can achieve good guide effect when they are assembled at the start.

Other improvement features and advantages of the present disclosure will be set forth in the subsequent specific embodiments and will partially become obvious from the specification or be understood from practice of the present disclosure. The objects and other advantages of the present disclosure can be achieved and obtained by using the structure indicated in the specification and the drawings.

Figure 1:
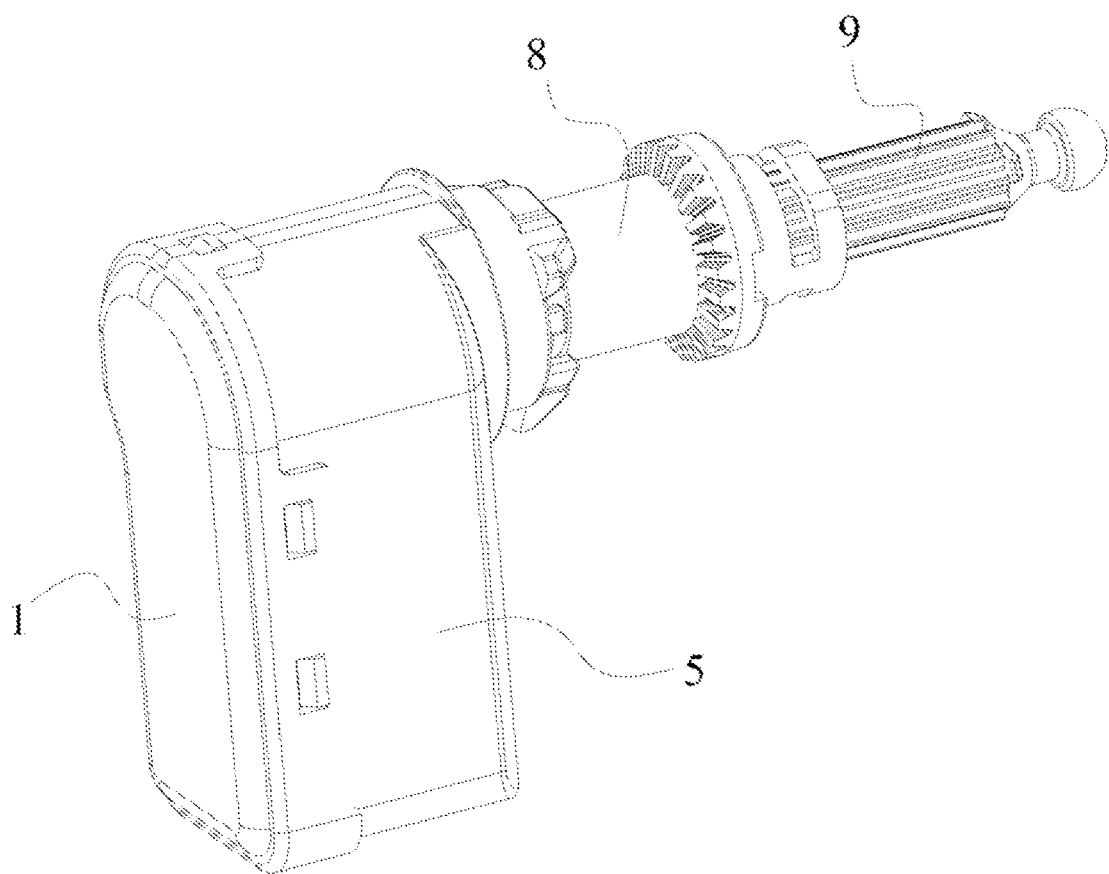
FIG. 1 is a structural schematic diagram illustrating a vehicular headlamp adjustment device according to an embodiment of the present disclosure.
Figure 2:
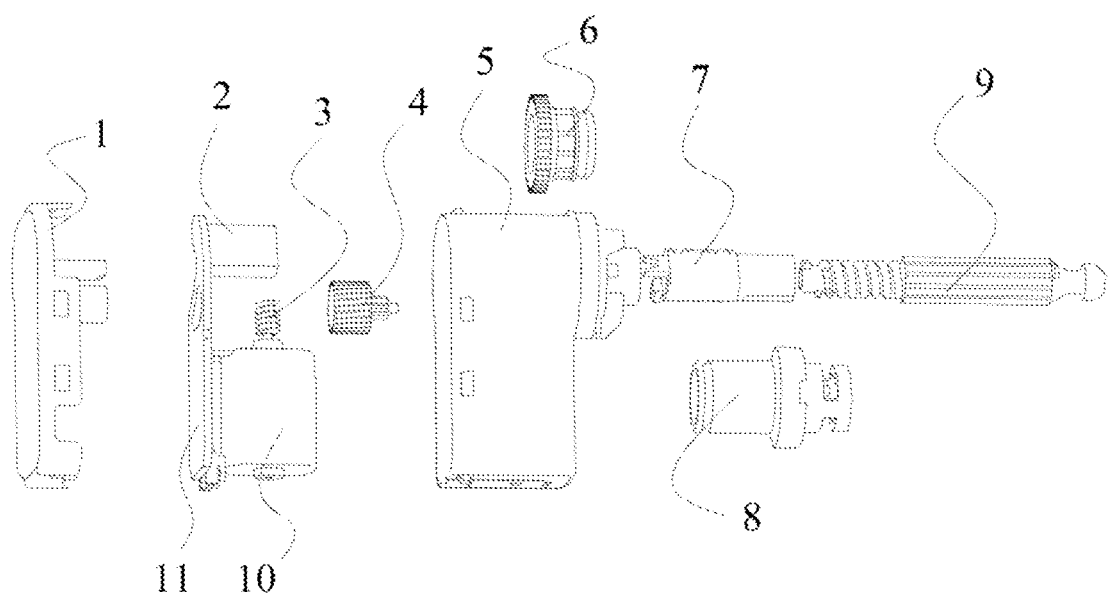
FIG. 2 is an exploded view of a structure of a vehicular headlamp adjustment device according to an embodiment of the present disclosure.
Figure 3:
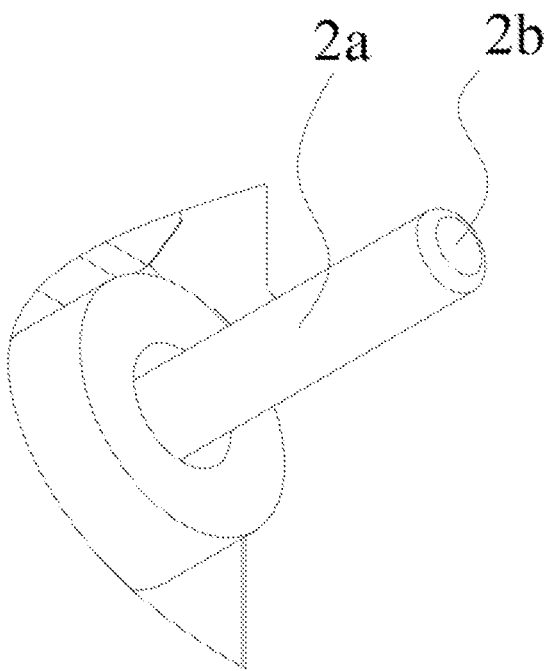
FIG. 3 is a structural schematic diagram illustrating a motor output shaft according to a first embodiment of the present disclosure.
Figure 4:
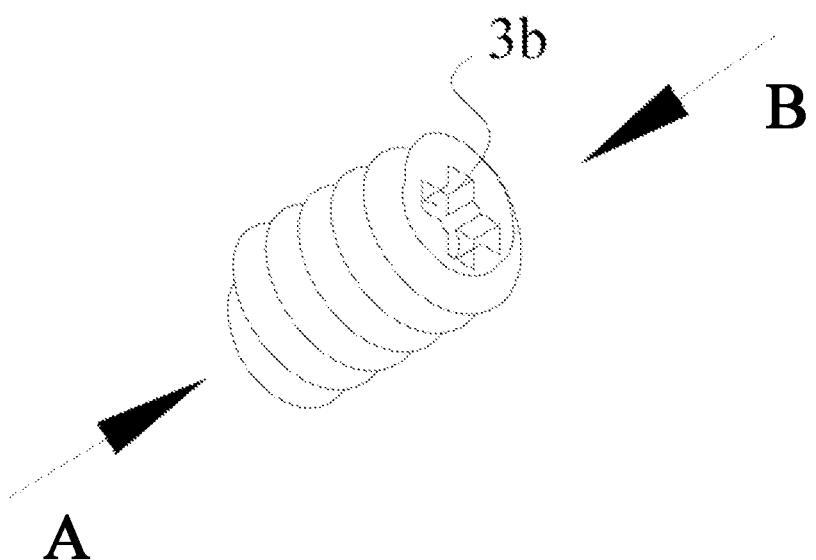
FIG. 4 is a structural schematic diagram illustrating a worm rod according to a first embodiment of the present disclosure.
Figure 5:
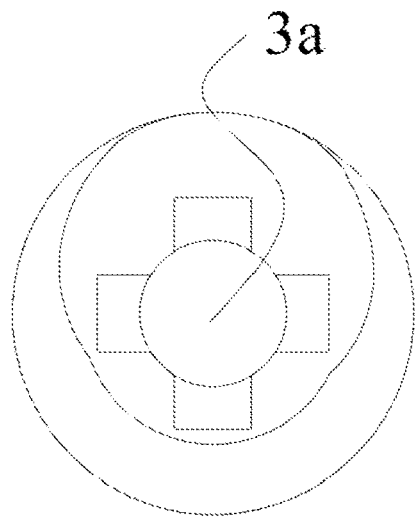
FIG. 5 is a view of B direction in FIG. 4.
Figure 6:
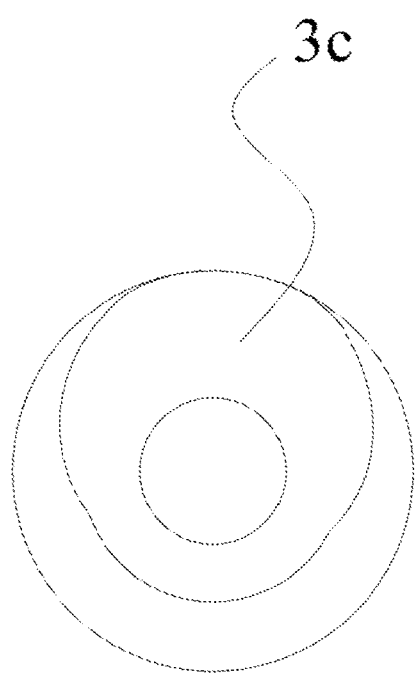
FIG. 6 is a view of A direction in FIG. 4.

Numerals of the drawings are described below:

1. cover plate, 1a. positioning column, 1b. fillet, 1c. limiting column, 1d. mounting hole, 2. motor assembly, 2a. output shaft, 2b. first end face, 2c. potentiometer rod, 3. worm rod, 3a. assembling hole, 3b. cross guide groove, 3c. second end face, 4. dual gear, 4a. annular insertion groove, 4b. inclined surface, 4c. positioning hole, 4d. insertion column, 4c. third end face, 4f. first round corner, 4g. insertion column outer wall, 5. housing, 5a. insertion hole, 5b. second round corner, 5c. annular insertion portion, 5d. fourth end face, 5e. insertion hole inner wall, 5f. positioning convex block, 5g. third round corner, 5h. first plane, 5i. first groove, 5j. second groove, 5k. limiting snap catch, 5l. second chamfer, 5m. fourth plane, 5n. positioning sleeve tube, 6. gear disk, 6a. first chamfer, 6b. second plane, 6c. annular positioning groove, 6d. reinforcing convex ring, 6e. reinforcing convex rib, 7. inner sleeve tube, 7a. positioning block, 7b. rectangular boss, 7c. second side surface, 7d. limiting fitting groove, 7e. local thread block, 7f. limiting block, 7f-1. third side surface, 7f-2. fourth side surface, 7g. third chamfer, 8. outer sleeve tube, 8a. process groove, 8b. narrow rib, 8c. first trapezoid boss, 8d. second trapezoid boss, 8e. fourth round corner, 8f. third plane, 8g. limiting groove, 9. ball head ejector rod, 9a. large round corner, 9b. guide block, 9c. baffle block, 9d. guide slope surface, 9e. first side surface, 9f. positioning groove, 10. motor, 11. circuit board, 12. manual adjustment piece.

DETAILED DESCRIPTIONS OF EMBODIMENTS

In order to make the above objects, features and advantages of the present disclosure clearer and more intelligible, the specific embodiments of the present disclosure will be further detailed below in combination with drawings.

Embodiment 1

As shown in FIGS. 1 to 12, the present disclosure provides a vehicular headlamp adjustment device, which comprises a housing 5. A mounting groove is disposed at a side of the housing 5 and a motor assembly 2 is disposed inside the mounting groove. A cover plate 1 is detachably disposed at an opening end of the mounting groove. Specifically, a plurality of fitting plates perpendicular to the cover plate 1 are disposed on the periphery of the cover plate 1, where a fitting hole is opened on each fitting plate. Further, fitting catches are disposed on an outer wall at a side of an opening end of the housing 5. When the cover plate 1 is press-fitted to the opening end of the housing 5, the fitting plates are attached in a surrounding way to the outer wall of the opening end of the housing 5, and the fitting catches are fitted to the corresponding fitting holes, so as to achieve quick fitting of the cover plate 1 to the housing 5 without needing any fasteners.

At the other side of the housing is disposed a mounting hole 1d in communication with the mounting groove, and a gear disk 6 is rotatably disposed inside the mounting hole 1d, where a gear portion of the gear disk 6 is located inside the mounting groove. A dual gear 4 is further disposed inside the mounting groove. A first gear of the dual gear 4 is in transmission cooperation with the motor assembly 2 and a second gear of the dual gear 4 is engaged with the gear portion of the gear disk 6. Specifically, in this embodiment, the motor assembly 2 comprises a motor 10 and a circuit board 11 for controlling the operation of the motor 10. The circuit board 11 is mounted in the mounting groove and the motor 10 is fixed on an inner wall of the mounting groove. An output shaft 2a of the motor 10 is connected with a worm rod 3 engaged with the first gear of the dual gear 4.

In addition, in the above structure, one end of the worm rod 3 is provided with an assembling hole 3a in which the output shaft 2a of the motor 10 is in interference fit. After the two components are assembled, a first end face 2b of the output shaft 2a is flush with a second end face 3c of the worm rod 3 so as to determine a mounting position of the worm rod 3 by using the second end face 3c. Further, a cross groove 3b is designed at one end of the assembling hole 3a close to the motor 10 to guide the output shaft 2a during the pre-mounting process.

In this embodiment, an inner sleeve tube 7 is cooperated helically in an inner hole of the gear disk 6, and a ball head ejector rod 9 is helically assembled in the inner sleeve tube 7. The motor 10 runs to drive the rotation of the worm rod 3 and further drive the rotation of the dual gear 4 and then the dual gear 4 drives the inner sleeve tube 7 helically cooperated therein to axially extend or retract. Thus, the ball head ejector rod 9 performs axial telescoping movement. This process is electrically adjusted.

Figure 7:
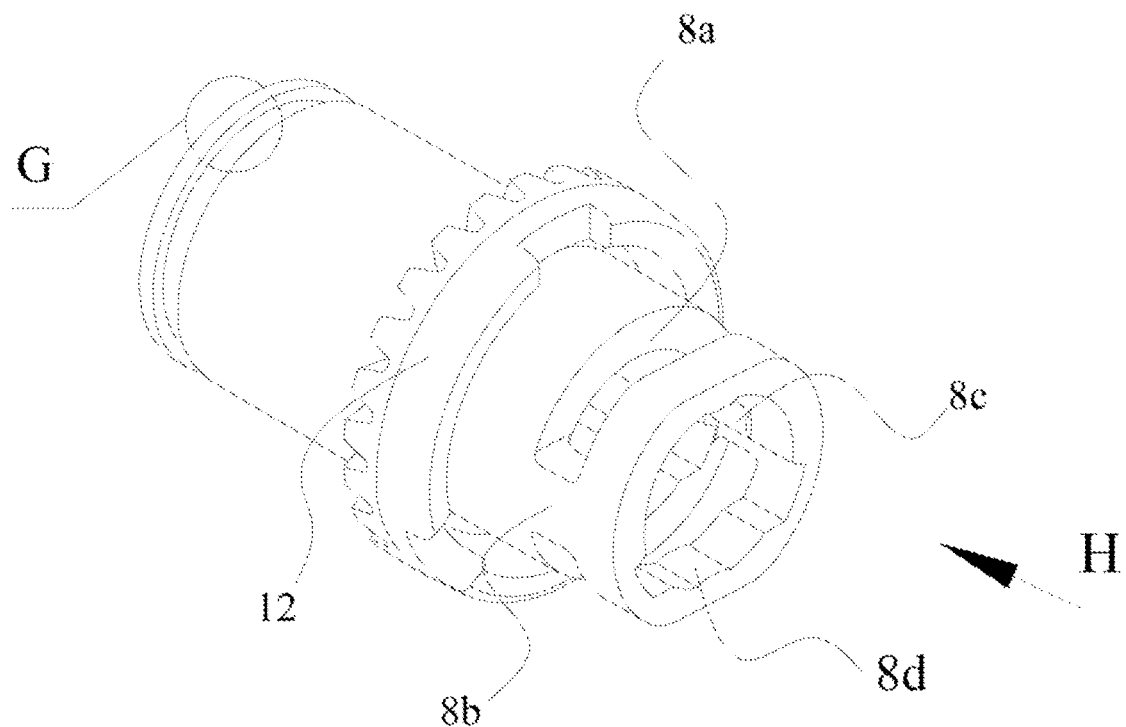
FIG. 7 is a structural schematic diagram illustrating an outer sleeve tube according to a first embodiment of the present disclosure.
Figure 8:
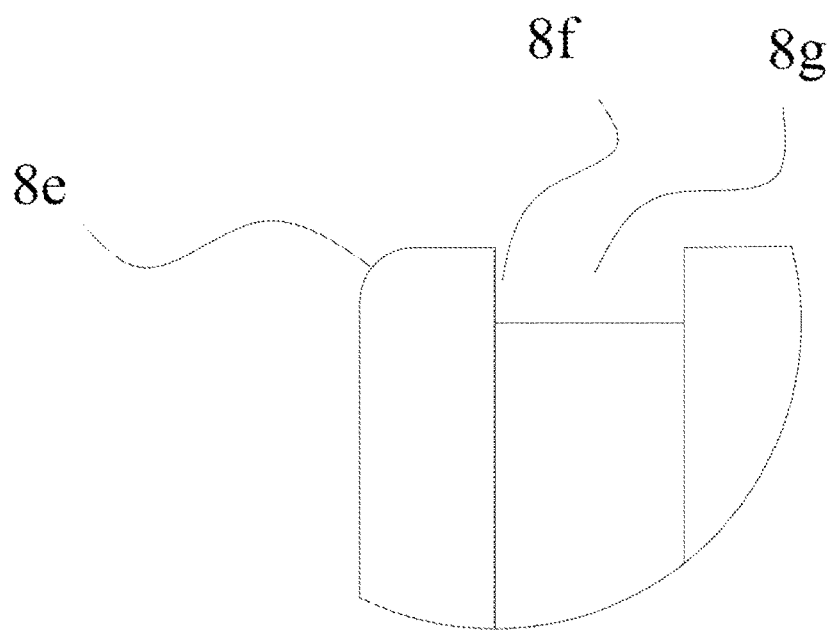
FIG. 8 is an enlarged structural diagram of the position G in FIG. 7.
Figure 12:
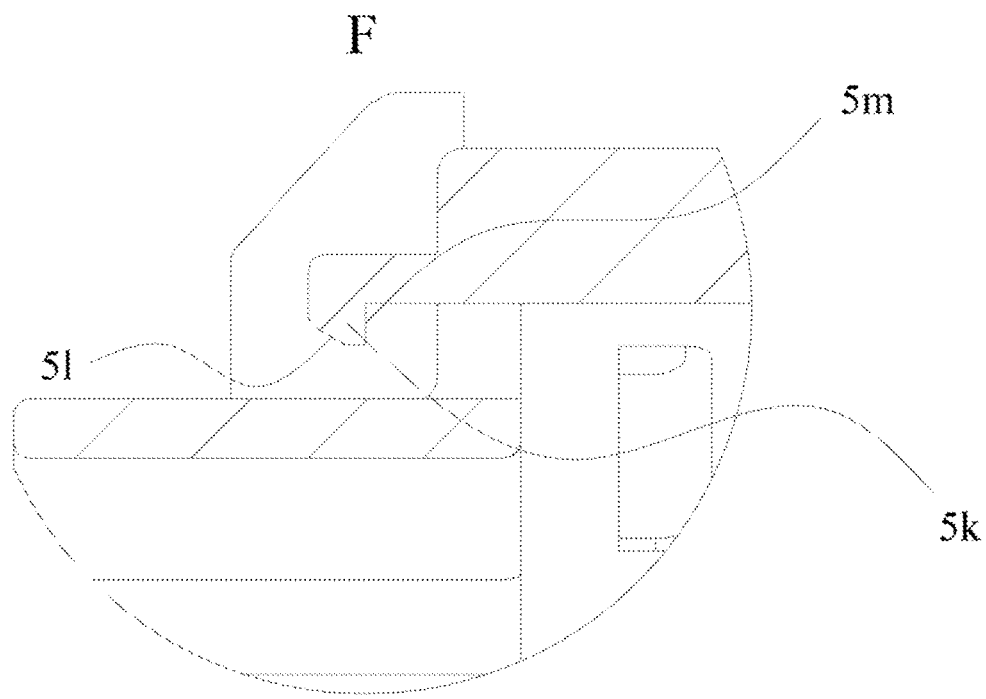
FIG. 12 is an enlarged structural diagram of the position F in FIG. 11.

In addition, as shown in FIGS. 7, 8 and 12, an outer sleeve tube 8 is further disposed in the mounting hole 1d and sleeved outside the inner sleeve tube 7. A positioning sleeve tube 5n is disposed coaxially with the mounting hole 1d at one end of the housing 5 away from the mounting groove. A plurality of limiting snap catches 5k are disposed along the periphery of the positioning sleeve tube 5n on the housing 5. One end of the outer sleeve tube 8 is sleeved outside the positioning sleeve tube 5n, and limiting grooves 8g cooperating with the limiting snap catches 5k are disposed an outer wall of one end of the outer sleeve tube 8 close to the positioning sleeve tube 5n. Specifically, the outer sleeve tube 8 is connected to the limiting snap catches 5k on the housing 5 by using the limiting grooves 8g, and a fourth round corner 8e is disposed at an outer end portion of the positioning sleeve tube 5n. A second chamfer 5l is disposed at an outer end portion of the limiting snap catches 5k. With the guiding effect of the fourth round corner 8e and the second chamfer 5l, the mounting difficulty is lowered. Furthermore, after being fitted to be in place, the limiting snap catches 5k can be fully fitted into the limiting grooves 8g. After fitting is completed, a third plane 8f of the limiting grooves 8g is abutted against a fourth plane 5m of the limiting snap catches 5k, so as to achieve axial limiting effect.

Two groups of axially-staggered positioning bosses are disposed on an inner wall of the other end of the outer sleeve tube 8, and a plurality of circumferentially-extending process grooves 8a are disposed on a sidewall of one end of the outer sleeve tube 8 close to the positioning boss. A plurality of circumferentially and uniformly-distributed and axially-extending positioning grooves 9f are disposed on a peripheral wall of one end of the ball head ejector rod 9 away from the inner sleeve tube 7, and each positioning boss is cooperated in the corresponding positioning groove 9f. A manual adjustment piece 12 is further disposed on the outer sleeve tube 8 to drive circumferential rotation of the ball head ejector rod. With the helical cooperation structure of the ball head ejector rod 9 and the inner sleeve tube 7, the ball head ejector rod can perform axial movement in the inner sleeve tube 7. In this structure, the manual adjustment piece 12 is an adjustment ring disposed on an outer wall of a middle portion of the outer sleeve tube 8. Further, one end of the adjusting ring is provided with an axial convex teeth and the other end is provided with several operation grooves. During manual adjustment, the entire outer sleeve tube 8 can be rotated by using a dedicated adjustment tool cooperating with the axial convex teeth or the operation grooves.

Figure 9:
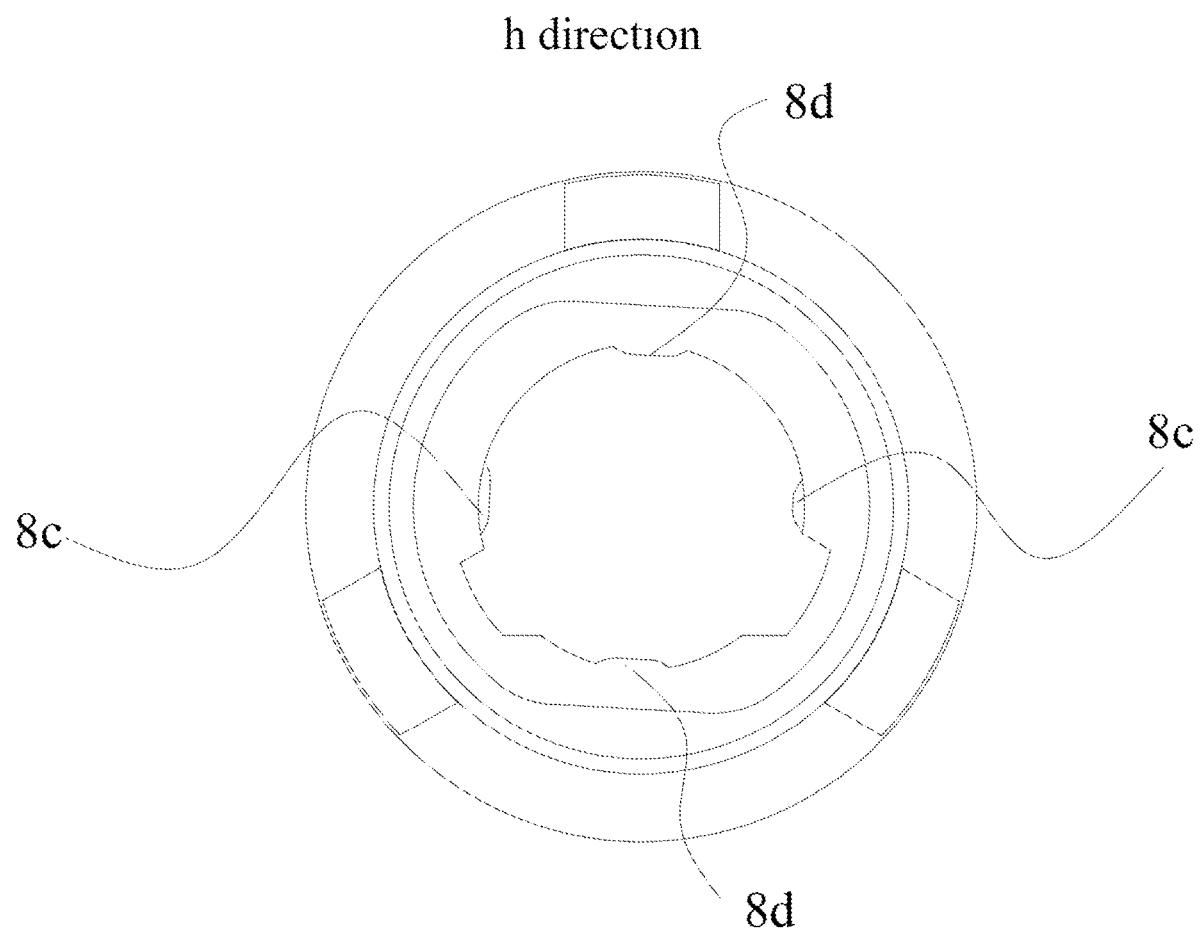
FIG. 9 is a view of H direction in FIG. 7.
Figure 10:
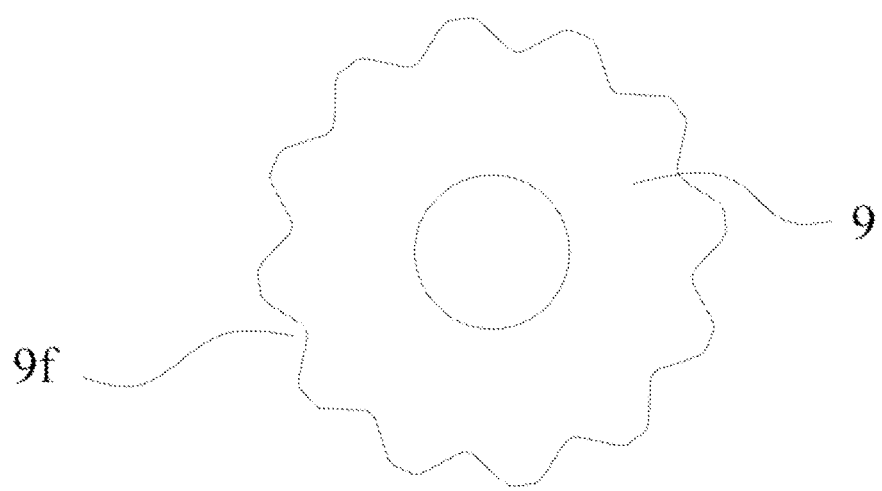
FIG. 10 is a sectional diagram illustrating a ball head ejector rod according to a first embodiment of the present disclosure.
Figure 11:
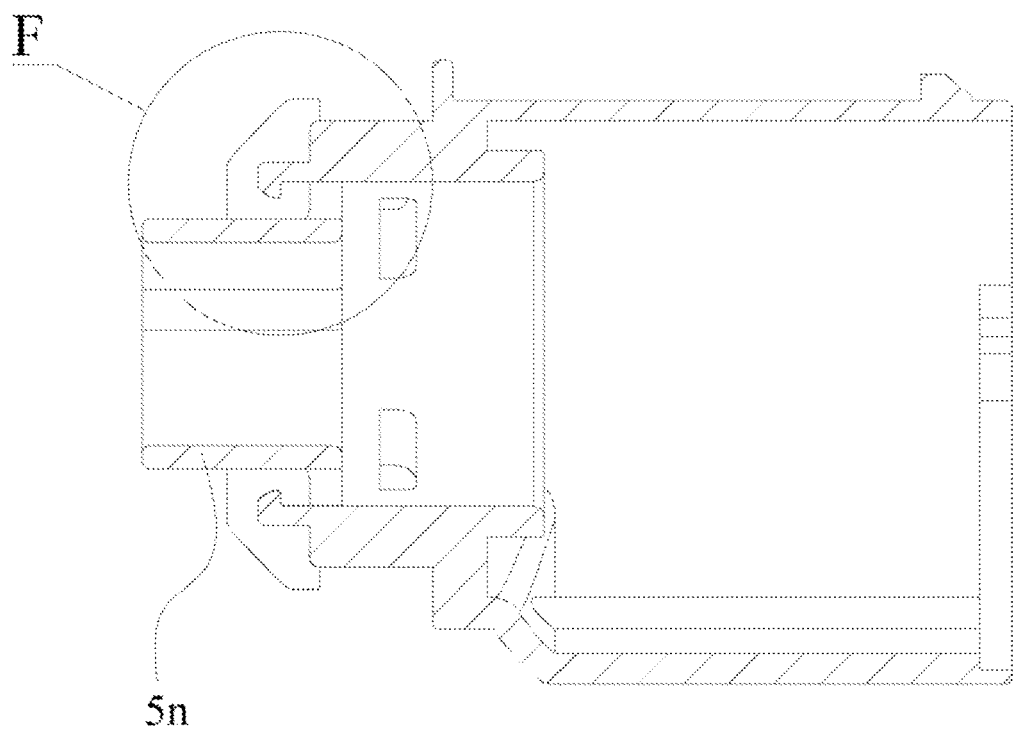
FIG. 11 is a sectional view of another angle of the housing according to a fifth embodiment of the present disclosure.

In this embodiment, preferably, as shown in FIGS. 7 and 9, each of the two groups of positioning bosses comprises a first trapezoid boss 8c and a second trapezoid boss 8d symmetrically disposed, and the positioning grooves 9f are triangular grooves as shown in FIG. 10. The four positioning bosses are all in cooperation with the positioning grooves 9f on the outer wall of the ball head ejector rod 9 to drive the rotation of the ball head ejector rod 9. Further, the four trapezoid bosses simultaneously act on the outer wall of the ball head ejector rod 9 during rotation to increase a drive torque of the circumferential rotation of the ball head ejector rod 9.

In the above structure, as shown in FIG. 7, during manual adjustment, the outer sleeve tube 8 is driven to rotate circumferentially by using an external force, and under the cooperation action of the positioning boss and the positioning grooves 9f, the ball head ejector rod 9 is rotated at the same time. Since one end of the ball head ejector rod 9 is cooperated with the inner sleeve tube 7 through threads, the ball head ejector rod 9 can perform axial extension or retraction under the guide effect of the threads during rotation. Furthermore, two groups of axially-staggered trapezoid bosses are designed on the inner wall of the outer sleeve tube 8. The axial staggering design can prevent the outer sleeve tube 8 from generating excessive deformation radially in a same plane when one end of the outer sleeve tube 8 away from the housing 5 slides on the positioning grooves 9f on the outer wall of the ball head ejector rod 9, thus avoiding damage to the parts. Furthermore, two hollow process grooves 8a are designed at a side of the outer sleeve tube 8 close to the trapezoid boss, and the two process grooves 8a are connected by a narrow rib 8b. This structure increases the deformability performance of the trapezoid bosses 8c sliding outside the positioning grooves 9f on the outer sleeve tube 8, thereby improving the telescoping flexibility of the ball head ejector rod 9.

Embodiment 2

Figure 13:
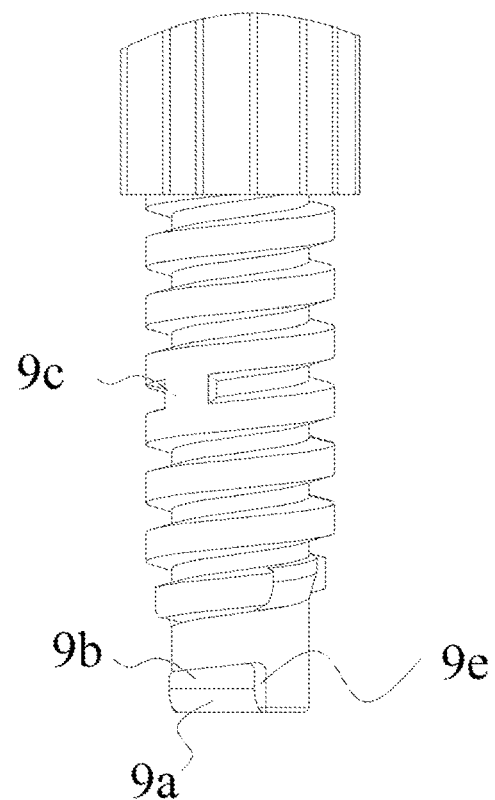
FIG. 13 is a partial structural diagram of a ball head ejector rod according to a second embodiment of the present disclosure.
Figure 14:
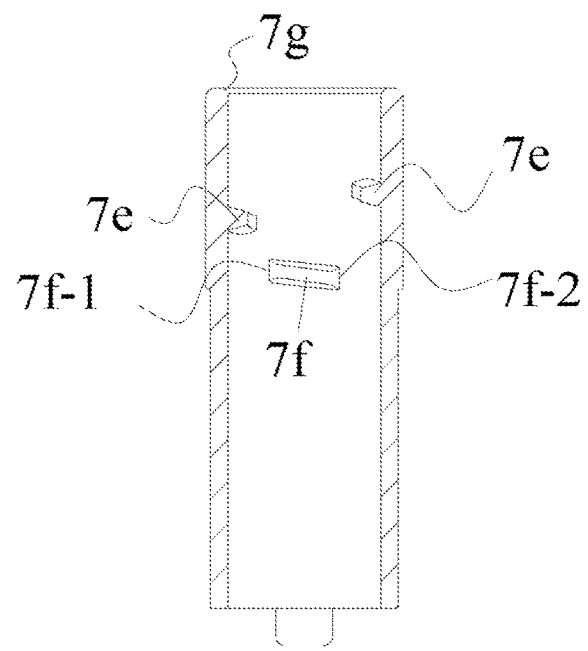
FIG. 14 is a semi-sectional structural diagram illustrating an inner sleeve tube according to a second embodiment of the present disclosure.
Figure 15:
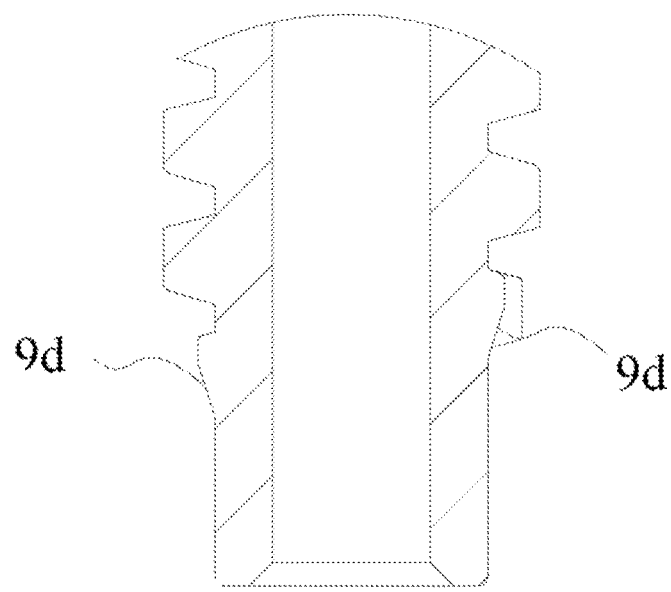
FIG. 15 is a partial semi-sectional diagram illustrating the structure of the ball head ejector rod in FIG. 13.

As shown in FIGS. 13 to 15, the structure of this embodiment is substantially same as the embodiment 1, that is, on the basis of the embodiment 1, the connection structure of the ball head ejector rod 9 is improved. Specifically, external thread is disposed on an outer wall of one end of the ball head ejector rod 9 close to the inner sleeve tube 7, and a baffle block 9c is disposed on the outer wall of the ball head ejector rod 9. The baffle block 9c is used to divide the external thread into two parts of structure. At least two thread blocks cooperating with the external thread are disposed on the inner wall of the inner sleeve tube 7, and a limiting block 7f is further disposed on the inner wall of the inner sleeve tube 7. A guide block 9b is further disposed on the outer wall of one end of the ball head ejector rod 9 close to the inner sleeve tube 7. When the ball head ejector rod 9 and the inner sleeve tube 7 rotate to a lower limit position, a side face of the guide block 9b is abutted against one side face of the limiting block 7f; when the ball head ejector rod 9 and the inner sleeve tube 7 rotate to an upper limit position, the baffle block 9c is abutted against another side face of the limiting block 7f.

More specifically, as shown in FIG. 13, in this embodiment, a large round corner 9a is disposed at a front end of the guide block 9b, and correspondingly, a third chamfer 7g is disposed an end portion of one end of the inner sleeve tube 7 close to the ball head ejector rod 9. During assembling process, the structure of the large round corner 9a and the chamfer can achieve good guiding effect, and thus reduce the accuracy requirement of the mounting and positioning of the parts. Furthermore, a side face 9e of the guide block 9b is attached to a third side face 7f-1 of the limiting block 7f on the inner wall of the inner sleeve tube 7 when the rotation proceeds to the lower limit position, so as to prevent axial rotation of the ball head ejector rod 9. Moreover, the external thread on one end of the ball head ejector rod 9 uses two-segment design, namely, the baffle block 9c is disposed in the middle of the thread. When the ball head ejector rod 9 rotates to the upper limit position, the baffle block 9c is attached to a fourth side face 7f-2 of the limiting block 7f so as to achieve stopping effect. On the other hand, the design of the baffle block 9c also facilitates changing the effective travel of the thread later. Two local thread blocks 7e with a round corner structure are disposed on the inner wall of the inner sleeve tube 7. Furthermore, two trapezoid guide slope surfaces 9d are disposed at the foremost end of the thread end of the ball head ejector rod 9. As shown in FIG. 13, when the inner sleeve tube 7 and the ball head ejector rod 9 are assembled, guiding can be achieved by using two local thread blocks 7e cooperating with the guide slope surfaces 9d. In addition, in the above structure, the two local thread blocks are both designed as round corner to avoid fracture of the structure arising from stress concentration.

Embodiment 3

As shown in FIGS. 16 to 20, on the basis of the embodiment 1 or 2, in this embodiment, the assembling structure of the inner sleeve tube 7 is further improved, namely, one end of the inner sleeve tube 7 close to the gear disk 6 cooperates with the gear disk 6 through thread, and two axially-symmetrical rectangular bosses 7b disposed on the outer wall of the other end of the inner sleeve tube 7. Two elongated grooves cooperating with the corresponding rectangular bosses 7b respectively are disposed symmetrically on the inner wall of the outer sleeve tube 8. One end of the inner sleeve tube 7 close to the gear disk 6 is provided with a limiting plate extending to the mounting groove, and a limiting fitting groove 7d cooperating with a potentiometer rod 2c on the motor assembly 2 is opened on an end portion of the limiting plate. One end of the inner sleeve tube 7 close to the gear disk 6 is further provided with a positioning block 7a protruding outwardly along a radial direction, and two limiting columns 1c are disposed on the cover plate 3. The positioning block 7a is cooperatively limited between the two limiting columns 1c.

Figure 16:
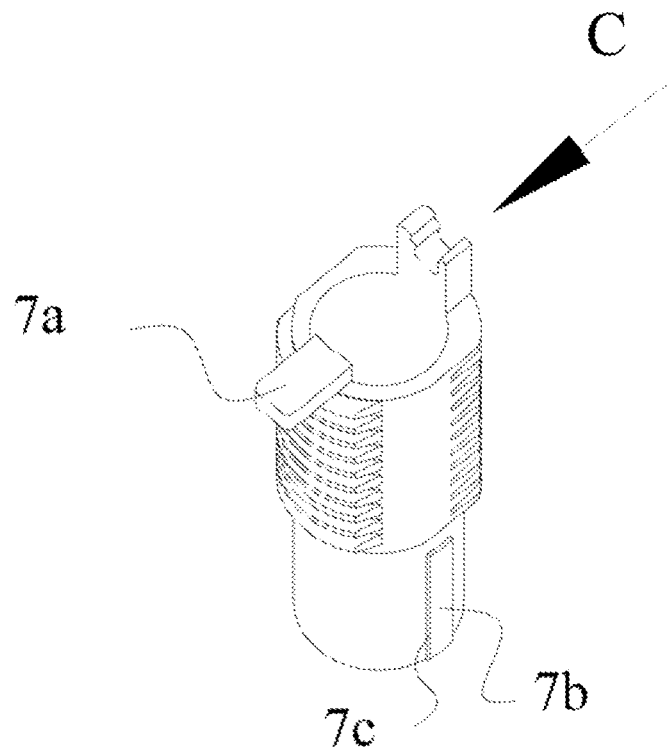
FIG. 16 is a structural schematic diagram illustrating an inner sleeve tube according to a third embodiment of the present disclosure.
Figure 17:
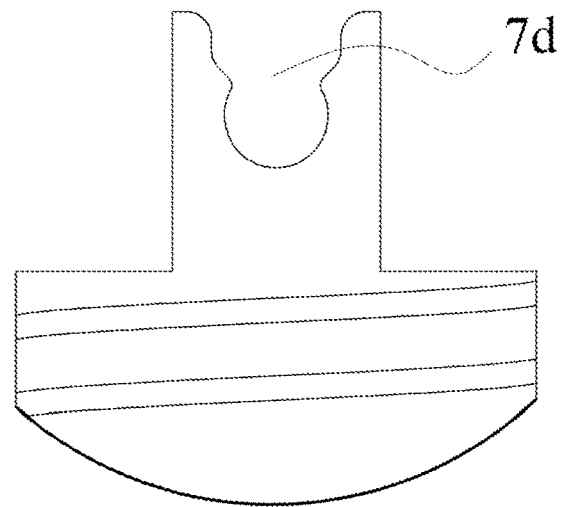
FIG. 17 is a view of C direction in FIG. 16.
Figure 18:
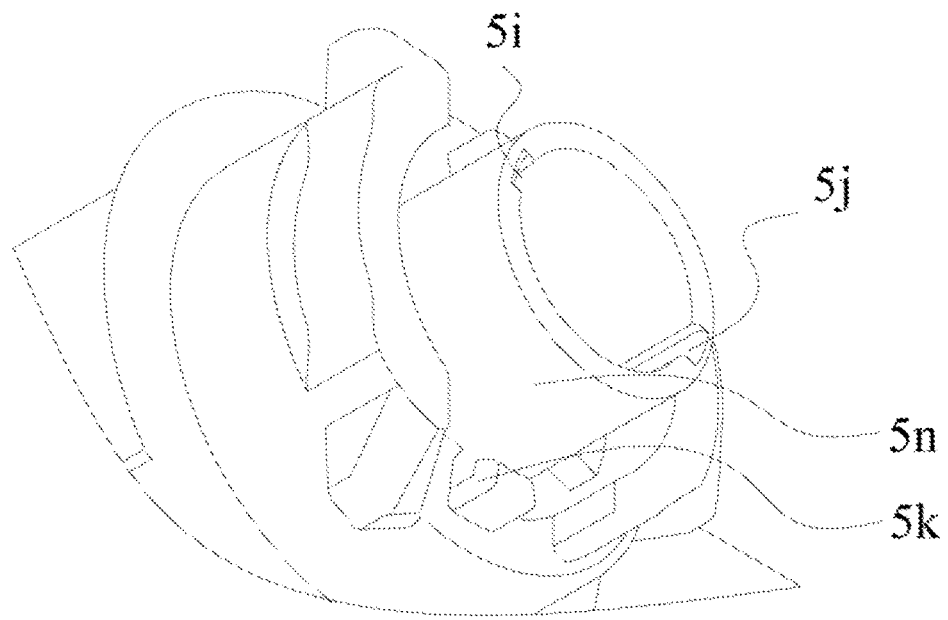
FIG. 18 is a schematic diagram illustrating a partial structure of a housing according to a third embodiment of the present disclosure.
Figure 19:
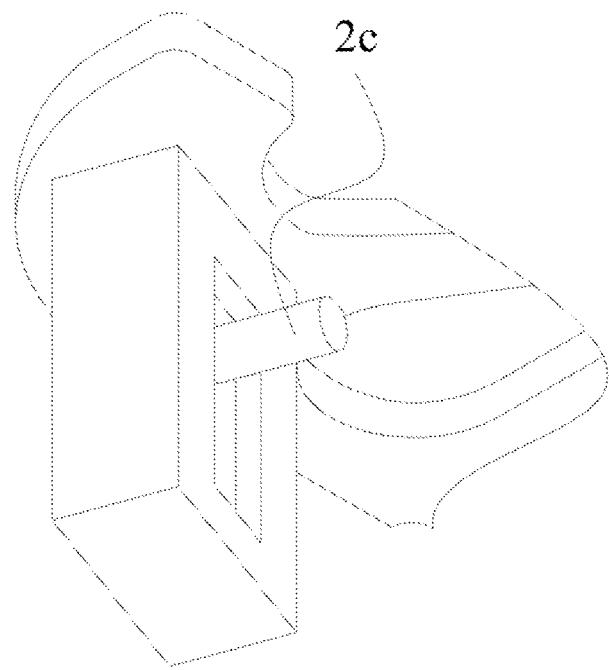
FIG. 19 is a schematic diagram illustrating a partial structure of a circuit board according to a third embodiment of the present disclosure.
Figure 20:
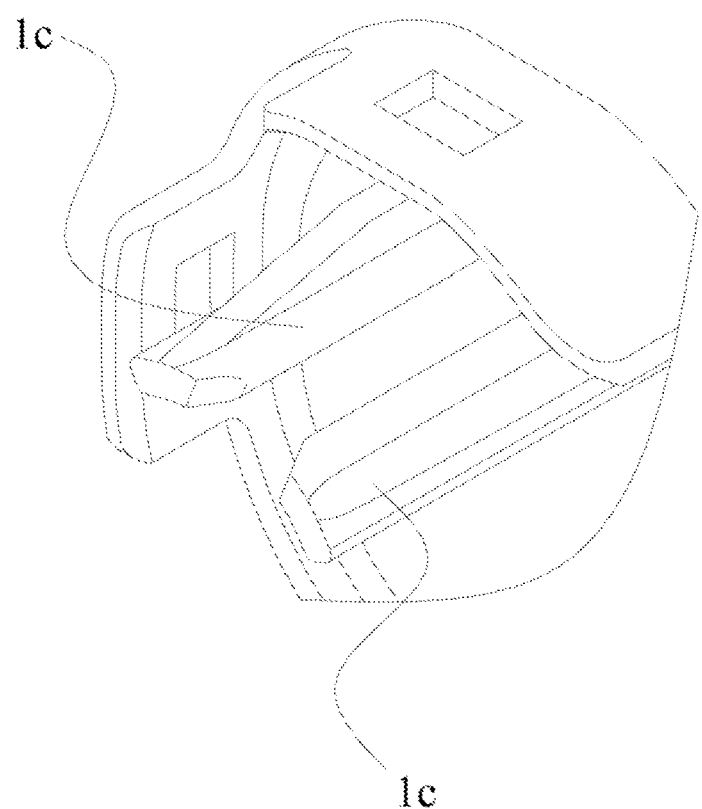
FIG. 20 is a schematic diagram illustrating a partial structure of a cover plate according to a third embodiment of the present disclosure.

Specifically, as shown in FIGS. 16 and 18, the inner sleeve tube 7 is assembled by using the two symmetrically disposed rectangular bosses 7b cooperating with two grooves 5i and 5j on the inner wall of the positioning sleeve tube 5n at one end of the housing 5, where a second surface 7c of the two rectangular bosses 7b is attached to a side plane of the corresponding grooves on the inner wall of the positioning sleeve tube 5n to achieve effective anti-rotation effect. This is a first anti-rotation structure. Furthermore, the disposal of the first groove 5i and the second groove 5j on the inner wall of the positioning sleeve tube 5n achieves guiding effect for the axial assembling of the inner sleeve tube 7 and thus the inner sleeve tube 7 can perform stable movement axially. In addition, in this embodiment, as shown in FIG. 17, the limiting fitting groove 7d is designed as a structure with upper part being large and lower part being small, namely, the upper part structure with large opening is used to pre-mount the potentiometer rod 2c of the motor assembly 2 so as to achieve guiding effect; the lower part structure with small opening is used to tightly assemble the potentiometer rod 2c. This structure is a second anti-rotation structure between the inner sleeve tube 7 and the housing 5. In another aspect, the cuboid positioning block 7a protruding outwardly along the radial direction at one end of the inner sleeve tube 7 is limited between two limiting columns 1c convexly disposed on the cover plate 3. This structure is a third structure for preventing rotation between the inner sleeve tube 7 and the housing 5. With disposal of the above three anti-rotation structures, a strong twist force can be provided during mounting process.

Embodiment 4

Figure 21:
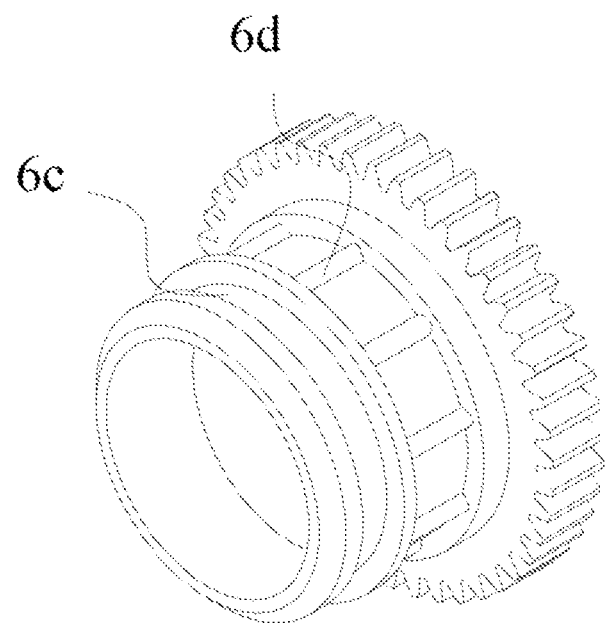
FIG. 21 is a structural schematic diagram illustrating a gear disk according to a fourth embodiment of the present disclosure.
Figure 22:
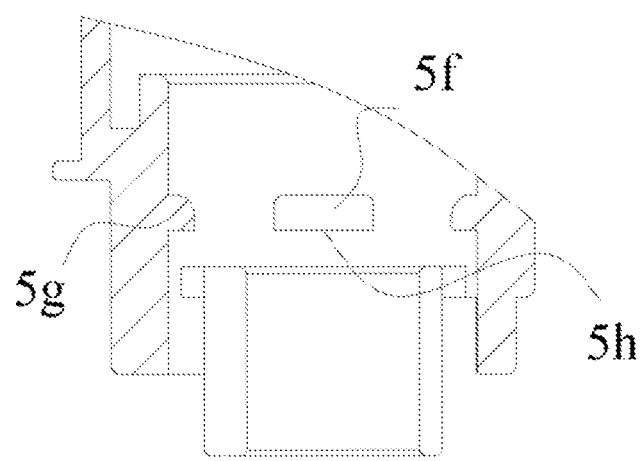
FIG. 22 is a partial schematic diagram illustrating a mounting structure of a housing and a gear disk according to a fourth embodiment of the present disclosure.
Figure 23:
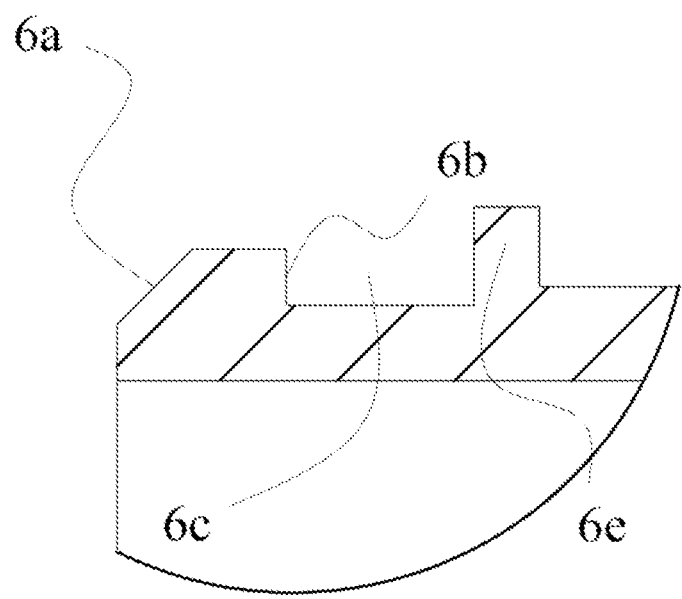
FIG. 23 is a partial schematic diagram illustrating a mounting structure of a housing and a gear disk in FIG. 21.
Figure 24:
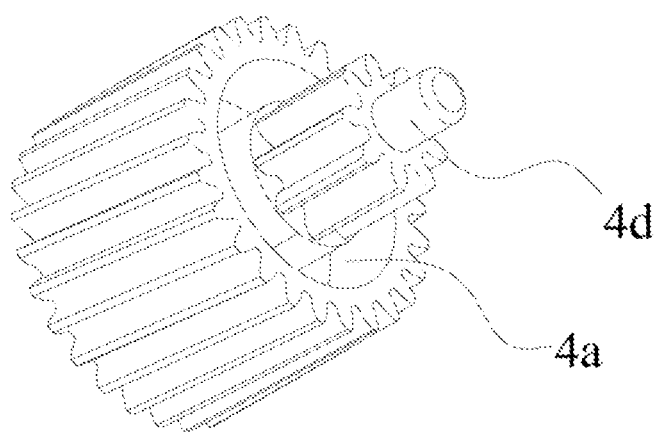
FIG. 24 is a partial schematic diagram illustrating a dual gear according to a fifth embodiment of the present disclosure.

As shown in FIGS. 21 to 23, on the basis of any structure in the embodiments 1 to 3, in this embodiment, the high-strength mounting structure of the gear disk 6 is designed. A positioning convex block 5f is disposed on an inner wall of one end of the mounting hole 1d away from the positioning sleeve tube 5n, and an annular positioning groove 6c cooperating with the positioning convex block 5f is disposed on an outer wall of one end of the gear disk 6 inside the mounting hole 1d. A reinforcing convex ring 6d is disposed at a position close to the annular positioning groove 6c on the outer wall of the gear disk 6. Further, a plurality of reinforcing convex ribs 64 extending axially are disposed on an outer wall of a part of the gear disk 6 between the reinforcing convex ring 6d and the gear portion of the gear disk 6.

Specifically, the mounting of the gear disk 6 into the mounting hole 1d is carried out with a fully-sealed mounting structure, namely, the gear disk 6 can be mounted by using the elastic performance of its material, increasing the anti-separation strength. A first chamfer 6a is designed at one end of the gear disk 6 mounted to the mounting hole 1d to facilitate pre-positioning of the gear disk 6 during mounting process. Similarly, a third chamfer 5g matching the first chamfer 6a is designed at an outer end of the positioning convex block 5f on the inner wall of the mounting hole 1d. During mounting process, an insertion end structure of of the gear disk is squeezed to deform and thus mounted into the mounting hole 1d though the elasticity of its material. The gear disk is mounted to be in place in cooperation with the positioning convex block 5f and the annular positioning groove 6c. Further, the separation of the two components can be avoided by cooperation of the first plane 5h and the second plane 6b. In addition, in order to avoid damage to the insertion end of the gear disk 6 during mounting process, a reinforcing convex ring 6d acting as a reinforcing structure is designed on an outer wall of the insertion end of the gear disk 6, and also, ten reinforcing convex ribs 6e are designed between the reinforcing convex ring 6d and the gear portion to further increase the pull-out force of the gear disk 6, as shown in FIG. 21.

Embodiment 5

As shown in FIGS. 24 to 29, on the basis of any structure in the embodiments 1 to 4, in this embodiment, more efficient transmission structure design is performed for the dual gear 4. A positioning column 1a is disposed on a sidewall of the cover plate 3 close to the mounting groove. and a positioning hole 4c in insertion cooperation with the positioning column 1a is disposed at one end of the dual gear 4 close to the first gear. An insertion column 4d is disposed at the other end of the dual gear 4, and an insertion hole 5*a* in insertion cooperation with the insertion column 4*d* is disposed on a bottom wall of the mounting groove. Further, the insertion column 4*d* is in interference fit with the insertion hole 5*a*, and an end face of the insertion column 4*d* is abutted against a bottom face of the insertion hole 5*a*.

Specifically, in this embodiment, the limiting structure of one end of the dual gear 4 and the cover plate 3 is described below.

By using a clamping force between the cover plate 3 and the housing 5, axial positioning can be achieved, and after the positioning is achieved, the dual gear 4 can rotate around its own axis. A fillet 1*b* is disposed at an outer end face of the positioning column 1*a*. With this disposal, when the positioning column 1*a* and the positioning hole 4*c* are cooperatively abutted against each other axially, the end of the positioning column 1*a* and the bottom of the positioning hole 4*c* are in the form of line-plane contact, reducing a friction resistance of the dual gear 4 during rotation.

In addition, the limiting structure of the other end of the dual gear 4 and the bottom wall of the mounting groove of the housing 4 is described below.

A third end face 4*c* of the insertion column 4*d* is inserted to be abutted against the bottom face of the insertion hole 5*a* on the bottom wall of the mounting groove, so as to achieve axial positioning. Further, a first round corner 4*f* and a second round corner 5*b* are designed respectively for the insertion column 4*d* and the insertion hole 5*a*, which reduces the requirements for the mounting accuracy. In this structure, an outer wall 4*g* of the insertion column 4*d* is in interference fit with an inner wall 5*e* of the insertion hole, which is not for achieving radial positioning.

Figure 25:
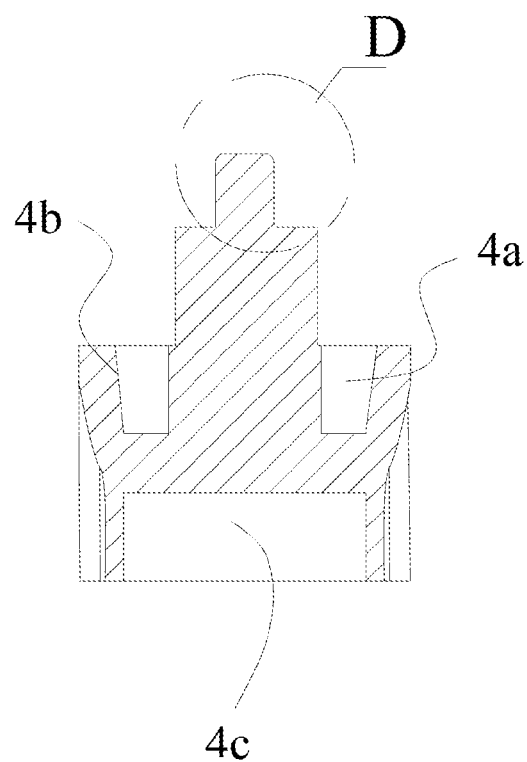
FIG. 25 is a sectional view of the dual gear in FIG. 24.
Figure 26:
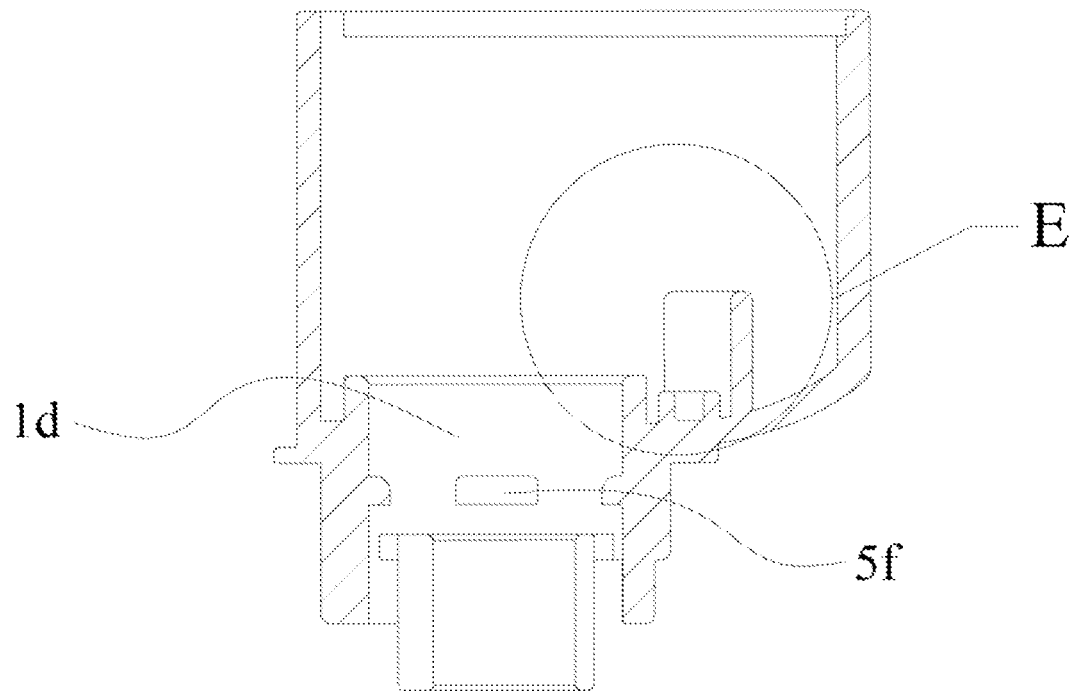
FIG. 26 is a sectional view of a housing according to a fifth embodiment of the present disclosure.
Figure 27:
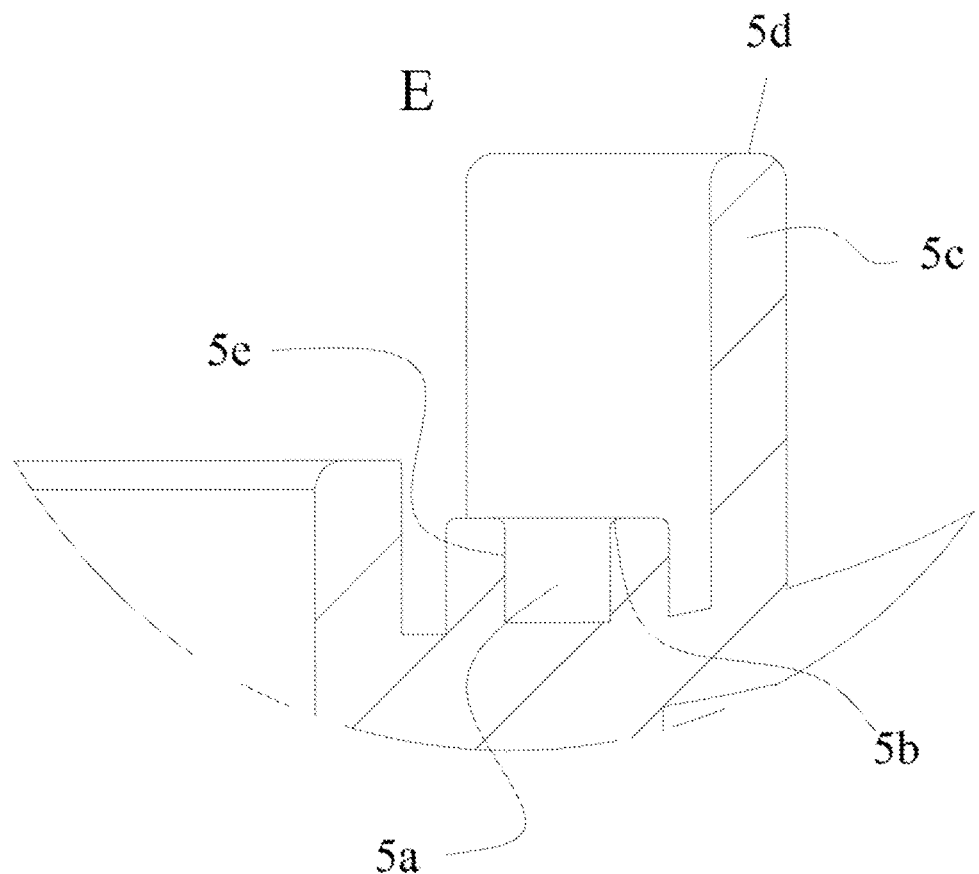
FIG. 27 is an enlarged structural diagram of the position E in FIG. 26.
Figure 28:
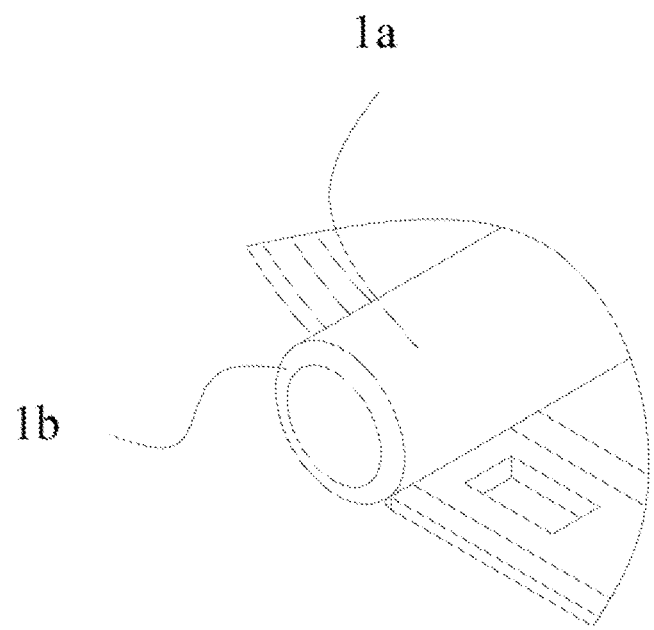
FIG. 28 is a partial schematic diagram illustrating a mounting structure of a cover plate and a dual gear according to a fifth embodiment of the present disclosure.
Figure 29:
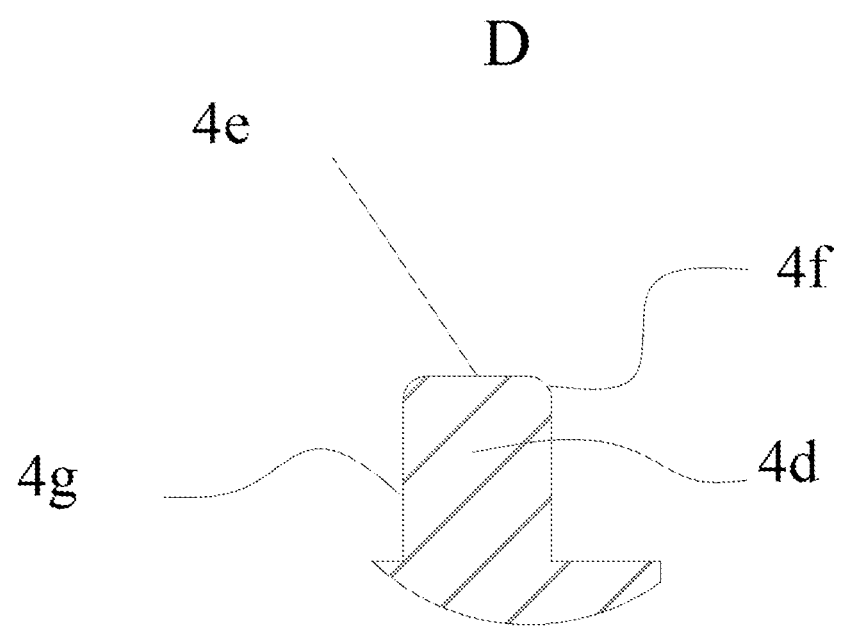
FIG. 29 is an enlarged structural diagram of the position D in FIG. 25.

As shown in FIGS. 25 and 27, annular insertion groove 4*a* is concavely disposed on an end face of the first gear of the dual gear 4 close to the second gear, and a cross section of the annular insertion groove 4*a* is a trapezoid structure with upper part being large and lower part being small. A positioning convex column is disposed on the bottom wall of the mounting groove and the insertion hole 5*a* is formed on an end face of the positioning convex column. An annular insertion portion 5*c* is further disposed around the positioning convex column on the bottom wall of the mounting groove. The annular insertion portion 5*c* is cooperatively inserted into the annular insertion groove 4*a*, and there is a gap reserved between an outer end face of the annular insertion portion 5*c* and the bottom of the annular insertion groove 4*a*. In other words, in this embodiment, the radial positioning of the dual gear 4 and the housing 5 is carried out by cooperation of the inner wall of the annular insertion groove 4*a* and the annular insertion portion 5*c*. Since two sidewalls of the annular insertion groove 4*a* are designed as inclined surface 4*b*, the annular insertion groove 4*a* and the annular insertion portion 5*c* are in the form of line contact. In this way, the friction resistance of the dual gear during rotation can be further reduced. Furthermore, in this structure, there is a gap between a bottom wall structure 4*f* of the annular insertion groove 4*a* and the outer end face 5*d* of the annular insertion portion 5*c*, avoiding excessive axial positioning.

Although the present disclosure is described as above, the scope of protection of the present disclosure is not limited hereto. Various changes and modifications made by those skilled in the arts within the spirit and scope of the present disclosure shall fall within the scope of protection of the present disclosure.

The invention claimed is:

1. A vehicular headlamp adjustment device, comprising a housing (5), and a mounting groove is disposed at a side of the housing (5) and a motor assembly (2) is disposed inside the mounting groove; a cover plate (1) is disposed at an opening end of the mounting groove; at the other side of the housing (5) is disposed a mounting hole (1*d*) in communication with the mounting groove, and a gear disk (6) is rotatably disposed inside the mounting hole (1*d*); a gear portion of the gear disk (6) is located inside the mounting groove; a dual gear (4) is further disposed inside the mounting groove; a first gear of the dual gear (4) is in transmission cooperation with the motor assembly (2) and a second gear of the dual gear (4) is engaged with the gear portion of the gear disk (6); an inner sleeve tube (7) is cooperated helically in an inner hole of the gear disk (6), and a ball head ejector rod (9) is helically assembled in the inner sleeve tube (7), wherein an outer sleeve tube (8) is further disposed in the mounting hole (1*d*) and the outer sleeve tube (8) is sleeved outside the inner sleeve tube (7); a positioning sleeve tube (5*n*) is disposed coaxially with the mounting hole (1*d*) at one end of the housing (5) away from the mounting groove; a plurality of limiting snap catches (5*k*) are disposed along the periphery of the positioning sleeve tube (5*n*) on the housing (5); one end of the outer sleeve tube (8) is sleeved outside the positioning sleeve tube (5*n*), and limiting grooves (8*g*) cooperating with the limiting snap catches (5*k*) are disposed an outer wall of one end of the outer sleeve tube (8) close to the positioning sleeve tube (5*n*); two groups of axially-staggered positioning bosses are disposed on an inner wall of the other end of the outer sleeve tube (8), and a plurality of circumferentially-extending process grooves (8*a*) are disposed on a sidewall of one end of the outer sleeve tube (8) close to the positioning boss; a plurality of circumferentially and uniformly-distributed and axially-extending positioning grooves (9*f*) are disposed on a peripheral wall of one end of the ball head ejector rod (9) away from the inner sleeve tube (7), and each positioning boss is cooperated in the corresponding positioning groove; a manual adjustment piece (12) is further disposed on the outer sleeve tube (8), and the manual adjustment piece (12) drives the ball head ejector rod (9) to rotate circumferentially; the ball head ejector rod (9) performs an axial movement in the inner sleeve tube (7) under the helical cooperation of the ball head ejector rod (9) and the inner sleeve tube (7).

2. The vehicular headlamp adjustment device of claim 1, wherein each group of positioning bosses comprises two symmetrically-disposed trapezoid bosses, and the positioning grooves (9*f*) are triangular grooves; the small-diameter end of each trapezoid boss is cooperated in the corresponding triangular groove.

3. The vehicular headlamp adjustment device of claim 1, wherein external thread is disposed on an outer wall of one end of the ball head ejector rod (9) close to the inner sleeve tube (7), and a baffle block (9*c*) is disposed on the outer wall of the ball head ejector rod (9) to divide the external thread into two parts; at least two local thread blocks (7*e*) cooperating with the external thread are disposed on the inner wall of the inner sleeve tube (7), and a limiting block (7*f*) is further disposed on the inner wall of the inner sleeve tube (7); a guide block (9*b*) is further disposed on the outer wall of one end of the ball head ejector rod (9) close to the inner sleeve tube (7); when the ball head ejector rod (9) and the inner sleeve tube (7) rotate to a lower limit position, a side face of the guide block (9*b*) is abutted against one side face of the limiting block (7*f*); when the ball head ejector rod (9)

and the inner sleeve tube (7) rotate to an upper limit position, the baffle block (9c) is abutted against another side face of the limiting block (7f).

4. The vehicular headlamp adjustment device of claim 1, wherein one end of the inner sleeve tube (7) close to the gear disk (6) cooperates with the gear disk (6) through thread, and two axially-symmetrical rectangular bosses (7b) disposed on the outer wall of the other end of the inner sleeve tube (7); two elongated grooves cooperating with the corresponding rectangular bosses (7b) respectively are disposed symmetrically on the inner wall of the positioning sleeve tube (5n); one end of the inner sleeve tube (7) close to the gear disk (6) is provided with a limiting plate extending to the mounting groove, and a limiting fitting groove (7d) cooperating with a potentiometer rod (2c) on the motor assembly (2) is opened on an end portion of the limiting plate; one end of the inner sleeve tube (7) close to the gear disk (6) is further provided with a positioning block (7a) protruding outwardly along a radial direction, and two limiting columns (1c) are disposed on the cover plate (1); the positioning block (7a) is cooperatively limited between the two limiting columns (1c).

5. The vehicular headlamp adjustment device of claim 1, wherein a positioning convex block (5f) is disposed on an inner wall of one end of the mounting hole (1d) away from the positioning sleeve tube (5n), and an annular positioning groove (6c) cooperating with the positioning convex block (5f) is disposed on an outer wall of one end of the gear disk (6) inside the mounting hole (1d); a reinforcing convex ring (6d) is disposed at a position close to the annular positioning groove (6c) on the outer wall of the gear disk (6); a plurality of reinforcing convex ribs (6e) extending axially are disposed on an outer wall of a part of the gear disk (6) between the reinforcing convex ring (6d) and the gear portion of the gear disk (6).

6. The vehicular headlamp adjustment device of claim 1, wherein a positioning column (1a) is disposed on a sidewall of the cover plate (1) close to the mounting groove, and a positioning hole (4c) in insertion cooperation with the positioning column (1a) is disposed at one end of the dual gear (4) close to the first gear; an insertion column (4d) is disposed at the other end of the dual gear (4), and an insertion hole (5a) in insertion cooperation with the insertion column (4d) is disposed on a bottom wall of the mounting groove; the insertion column (4d) is in interference fit with the insertion hole (5a), and an end face of the insertion column (4d) is abutted against a bottom face of the insertion hole (5a).

7. The vehicular headlamp adjustment device of claim 6, wherein annular insertion groove (4a) is concavely disposed on an end face of the first gear of the dual gear (4) close to the second gear, and a cross section of the annular insertion groove (4a) is a trapezoid structure with upper part being large and lower part being small; a positioning convex column is disposed on the bottom wall of the mounting groove and the insertion hole (5a) is formed on an end face of the positioning convex column; an annular insertion portion (5c) is further disposed around the positioning convex column on the bottom wall of the mounting groove; the annular insertion portion (5c) is cooperatively inserted into the annular insertion groove (4a), and there is a gap reserved between an outer end face of the annular insertion portion (5c) and the bottom of the annular insertion groove (4a).

8. The vehicular headlamp adjustment device of claim 1, wherein the motor assembly (2) comprises a motor (10) and a circuit board (11) for controlling the operation of the motor (10); the circuit board (11) is mounted in the mounting groove and the motor (10) is fixed on an inner wall of the mounting groove; an output shaft (2a) of the motor (10) is connected with a worm rod (3), and the worm rod (3) is engaged with the first gear of the dual gear (4).

9. The vehicular headlamp adjustment device of claim 8, wherein one end of the worm rod (3) is provided with an assembling hole (3a), and the output shaft (2a) of the motor (10) is in interference fit in the assembling hole (3a); a cross guide groove (3b) is provided at one end of the assembling hole (3a) close to the motor (10).

* * * * *